(12) United States Patent
Kyathanahalli et al.

(10) Patent No.: US 10,489,345 B2
(45) Date of Patent: Nov. 26, 2019

(54) MULTIPLE RETENTION PERIOD BASED REPRESENTATIONS OF A DATASET BACKUP

(71) Applicant: NetApp, Inc., Sunnyvale, CA (US)

(72) Inventors: Sumeeth Channaveerappa Kyathanahalli, Mountain View, CA (US); Samuel A. Dillon, San Jose, CA (US); Ajay Pratap Singh Kushwah, San Ramon, CA (US); Sudhindra Prasad Tirupati Nagaraj, Sunnyvale, CA (US); Kshitij Wadhwa, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 559 days.

(21) Appl. No.: 15/081,672

(22) Filed: Mar. 25, 2016

(65) Prior Publication Data
US 2017/0277596 A1 Sep. 28, 2017

(51) Int. Cl.
*G06F 16/11* (2019.01)
*G06F 16/27* (2019.01)
*G06F 11/14* (2006.01)

(52) U.S. Cl.
CPC ........ *G06F 16/125* (2019.01); *G06F 11/1448* (2013.01); *G06F 11/1456* (2013.01); *G06F 16/27* (2019.01)

(58) Field of Classification Search
CPC ........... G06F 11/1456; G06F 17/30289; G06F 17/30551; G06F 17/30011; G06F 17/504; G06F 16/125
See application file for complete search history.

(56) References Cited

U.S. PATENT DOCUMENTS

| 6,088,694 | A  | * | 7/2000 | Burns | G06F 11/1451 |
| 8,527,468 | B1 | * | 9/2013 | Crafford | G06F 16/93 |
| | | | | | 707/662 |
| 8,554,735 | B1 | | 10/2013 | Wible et al. | |
| 8,825,971 | B1 | | 9/2014 | Auchmoody et al. | |
| 8,886,901 | B1 | | 11/2014 | Hsu et al. | |

(Continued)

OTHER PUBLICATIONS

International Search Report and Written Opinion for Application No. PCT/US20171024156 dated Aug. 1, 2017, 22 pages.

(Continued)

*Primary Examiner* — Etienne P Leroux
(74) *Attorney, Agent, or Firm* — Pepper Hamilton LLP

(57) ABSTRACT

A storage tier manager creates different representations of a dataset backup for different retention periods. Each of the representations of the dataset backup is distinctly identifiable despite initially representing a same dataset backup. The representations are structured metadata corresponding to the dataset backup. One representation is a cached backup version of the dataset backup ("cached backup" or "cached representation") provided for low latency access while residing at a storage tier of the backup appliance for a relatively short retention period according to a lifecycle management policy. The other representation is a cloud backup version of the dataset backup ("cloud backup" or "cloud representation") provided for persisting into cloud storage for a longer retention period according to the lifecycle management policy.

18 Claims, 8 Drawing Sheets

(56) References Cited

U.S. PATENT DOCUMENTS

| | | |
|---|---|---|
| 8,909,845 B1 | 12/2014 | Sobel et al. |
| 9,128,948 B1 | 9/2015 | Raorane |
| 9,563,517 B1 | 2/2017 | Natanzon et al. |
| 9,715,434 B1 | 7/2017 | Xu et al. |
| 2005/0125411 A1* | 6/2005 | Kilian ............... G06F 16/2477 |
| 2010/0274772 A1* | 10/2010 | Samuels ............ G06F 16/1748 |
| | | 707/693 |
| 2010/0293147 A1* | 11/2010 | Snow ............... G06F 17/30067 |
| | | 707/640 |
| 2011/0016091 A1 | 1/2011 | Prahlad et al. |
| 2011/0040728 A1 | 2/2011 | Akirav et al. |
| 2011/0066799 A1* | 3/2011 | Gold ................. G06F 11/1453 |
| | | 711/111 |
| 2011/0161297 A1 | 6/2011 | Parab |
| 2012/0066656 A1* | 3/2012 | Sripada ................ G06F 17/504 |
| | | 716/108 |
| 2012/0095968 A1 | 4/2012 | Gold |
| 2012/0117029 A1 | 5/2012 | Gold |
| 2013/0110778 A1 | 5/2013 | Taylor et al. |
| 2014/0189269 A1* | 7/2014 | Hughes ............ G06F 17/30194 |
| | | 711/162 |
| 2014/0344234 A1* | 11/2014 | Amarendran ....... G06F 11/1458 |
| | | 707/694 |
| 2015/0261776 A1 | 9/2015 | Attarde et al. |
| 2015/0261791 A1 | 9/2015 | Berry et al. |
| 2015/0261792 A1 | 9/2015 | Attarde et al. |
| 2016/0077926 A1* | 3/2016 | Mutalik ............ G06F 11/1456 |
| | | 711/162 |
| 2016/0086670 A1* | 3/2016 | Gross .................... G11C 16/14 |
| | | 365/185.24 |
| 2016/0162207 A1 | 6/2016 | Sharma et al. |

OTHER PUBLICATIONS

International Preliminary Report on Patentability for Application No. PCT/US2017/024156 dated Sep. 25, 2018, 14 pages.

* cited by examiner

US 10,489,345 B2

MULTIPLE RETENTION PERIOD BASED REPRESENTATIONS OF A DATASET BACKUP

BACKGROUND

The disclosure generally relates to the field of data processing and more particularly to backing up data.

Organizations back up to public and/or private cloud storage ("cloud back up") to reduce information technology ("IT") costs. With cloud back up, an organization can scale more easily since an IT department of an organization can avoid the cost, in both time and money, of expanding their storage infrastructure. For a cloud back up, the organizations' data is typically deduplicated and compressed before being stored into public or private cloud storage.

BRIEF DESCRIPTION OF THE DRAWINGS

Aspects of the disclosure may be better understood by referencing the accompanying drawings.

DESCRIPTION

Figure 1:
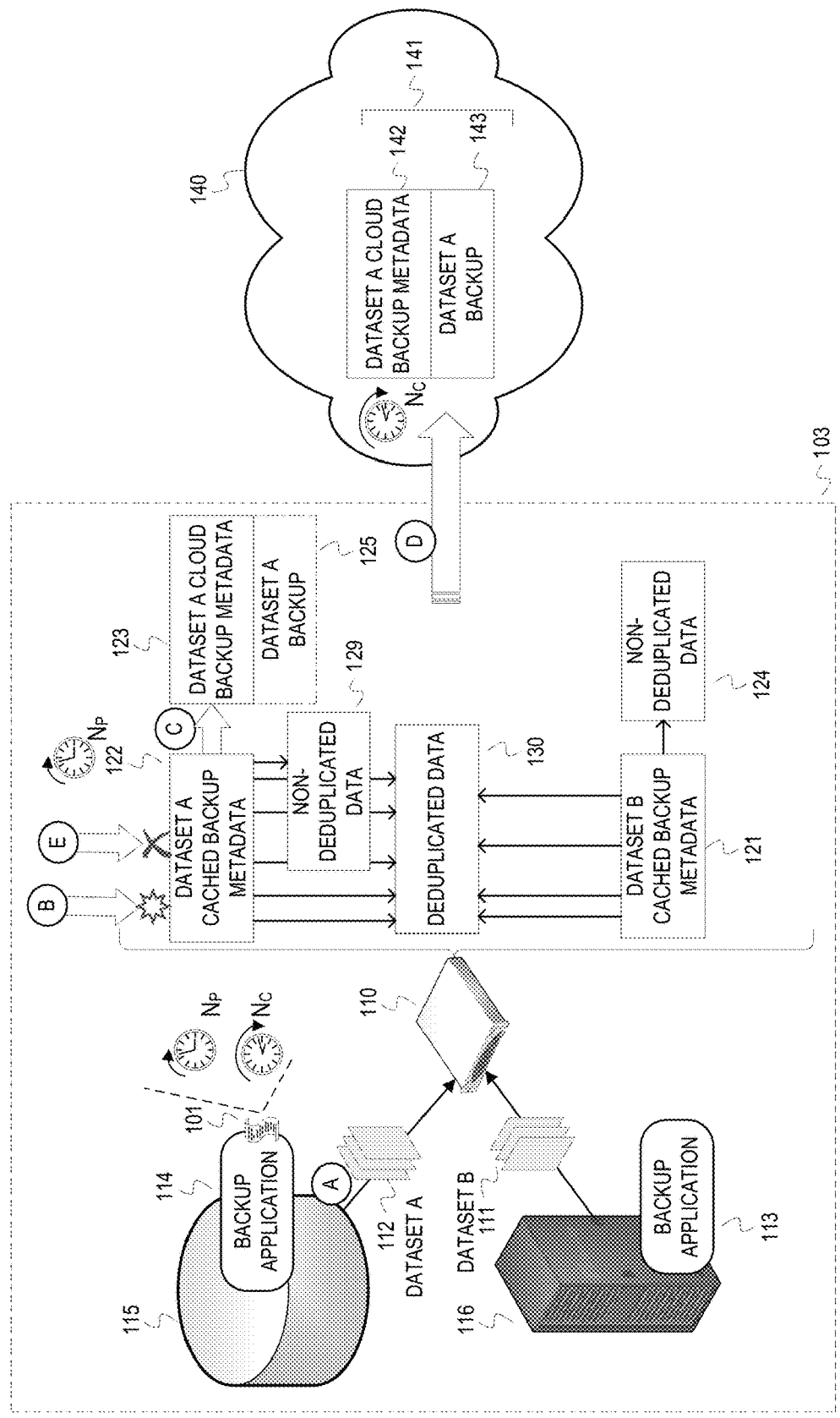
FIG. 1 provides a conceptual block diagram depicting a backup appliance creating two different representations for a dataset backup for different retention periods.

The description that follows includes example systems, methods, techniques, and program flows that embody aspects of the disclosure. However, it is understood that this disclosure may be practiced without these specific details. For instance, this disclosure refers to storing data temporarily at a local backup appliance prior to migrating the dataset backup to a cloud storage. Migrating data from a backup appliance to the cloud is only one example of tier-to-tier migration. Aspects of this disclosure can be applied to other tier-to-tier data migrations, such as between two cloud targets that have different input/output performance capabilities. In other instances, well-known instruction instances, protocols, structures and techniques have not been shown in detail in order not to obfuscate the description.

Introduction

To facilitate cloud back up while allowing for local recovery of data, an organization can use a back up appliance that integrates local caching with cloud back up ("integrated cloud back up appliance"). When data is to be backed up into the cloud, the data, in various forms, traverses the integrated cloud back up appliance from a storage server to the cloud. The integrated cloud back up appliance locally stores the dataset backup, which allows for efficient recovery of a dataset backup from the integrated cloud back up appliance. The integrated cloud back up appliance then migrates the data back up to a designated cloud target. The integrated cloud back up appliance can deduplicate, compress, and encrypt the data from the storage server when storing locally. Thus, the integrated cloud back up appliance may be migrating compressed, encrypted data to the designated cloud target.

Overview

An application that manages data at a storage tier ("storage tier manager") can be designed to create different representations or versions of a dataset backup. Each of the representations of the dataset backup is distinctly identifiable despite initially representing a same dataset backup. These different representations are associated with different retention periods. This provides administrators greater control in lifecycle management of data and allows for additional data management functions. The representations are structured metadata corresponding to the dataset backup. Although deduplication causes the representations to reference a same dataset backup, the representations and the dataset backup are logically two different dataset backups that can diverge from subsequent manipulations. One representation is a cached backup version of the dataset backup ("cached backup" or "cached representation") provided for low latency access while residing at a storage tier of the backup appliance for a relatively short retention period according to a lifecycle management policy. The other representation is a cloud backup version of the dataset backup ("cloud backup" or "cloud representation") provided for persisting into cloud storage for a longer retention period according to the lifecycle management policy.

Example Illustrations

FIG. 1 provides a conceptual block diagram depicting a backup appliance creating two different representations for a dataset backup for different retention periods. The backup appliance 110 operates as a cache for a dataset backup from the perspective of a data site 103. The data site 103 also includes a data store 115 and a backup server 116. The data store 115 hosts a backup application 114 and the backup server 116 hosts a backup application 113.

FIG. 1 is annotated with a series of letters A-D. These letters represent stages of operations, each of which may comprise one or multiple operations. The stages are not necessarily exclusive and can overlap. Although these stages are ordered for this example, the stages illustrate one example to aid in understanding this disclosure and should not be used to limit the claims. Subject matter falling within the scope of the claims can vary with respect to the order and some of the operations.

Stage A comprises the backup application 114 transmitting a dataset A 112 to the backup appliance 110 for backup of the dataset A 112. Stage A is triggered by the backup application 113 requesting the backup appliance 110 to back up the dataset A to a cloud target. In this illustration, the cloud target is in cloud storage 140. Before writing the dataset A 112, the backup application 114 opens a connection with the backup appliance 110 according to a storage network protocol, such as the Common Internet File System (CIF S) protocol or the Network File System (NFS) protocol or a proprietary protocol using custom RPCs (remote procedure calls). The backup applications 114 communicates a request(s) that indicates an identifier for the dataset A 112, the cloud storage 140 as a cloud target for the cloud backup, and an indication that two retention periods (Nr and Nc) govern the dataset A backup. A data lifecycle management policy 101 defines the two retention periods. The retention period Nr specifies a time period (usually on the order of days or weeks) for the dataset A backup to be cached at the backup appliance 110 and the retention period Nc specifies a time period (usually on the order of months or years) for the dataset A backup to persist in the cloud storage 140. In some cases, expiration of the time period Nr can trigger migration of the dataset A backup to cloud storage with different attributes (e.g., different accessibility and different recovery guarantees). After establishing the connection with the backup appliance 110, the backup application 114 sets the backup appliance 110 as a backup target, effectively an intermediate/transient backup target, and begins transmitting dataset A 112 to the backup appliance 110. The backup application 114 transmits the dataset A 112 as fixed or variable size constituent data units (e.g., extents, data blocks, etc.).

Stage B comprises the backup appliance 110 creating a first representation of the backup for dataset A 112 on the backup appliance 110. Stage B is triggered by the request from the backup application 114. As mentioned, the request indicates that the backup for the dataset A 112 has two retention periods. Based on the indication of two retention periods, the backup appliance 110 creates a first representation of the dataset A backup, which corresponds to the retention period Nc. This first representation includes dataset A backup metadata 122. The dataset A backup metadata 122 includes an identifier for the metadata 122 (e.g., an identifier that is unique within a namespace managed by the backup appliance 110). The metadata 122 also includes the identifier of the dataset A 112 and metadata of the dataset A (e.g., permissions, size, creation data, etc.). While receiving the constituent data units of the dataset A 112, the backup appliance 110 performs storage efficiency operations including deduplication. The backup appliance 110 may also apply compression and encryption to the backup of the dataset A 112. As the dataset A 112 is processed and locally stored, the backup appliance 110 updates the metadata 122 with references to the constituent units of the dataset A backup. Since deduplication is being performed, the metadata 122 can reference both deduplicated data and non-deduplicated data. In this illustration, a backup application 113 has at some point, either prior to stage A or overlapping with stage A, transmitted a dataset B 111 to the backup appliance 110 for back up. The backup appliance 110 discovers duplicate data between the dataset A 112 and the dataset B 111 while performing deduplication operations. As a result, the metadata 122 references non-deduplicated data 129 (i.e., data that is not duplicated on the backup appliance 110) and deduplicated data 130. To avoid over-complication, the deduplicated data 130 is only referenced by the metadata 122 and database B cached backup metadata 121. The dataset B cached backup metadata 121 also references non-deduplicated data 124 corresponding to the dataset B 111.

Stage C comprises the backup appliance 110 creating a second representation of the backup of dataset A 112 based on the retention period NP. Stage C can be triggered by an explicit request from the backup application 114 to create a second representation of the dataset A backup, can be an implicit request from an indication of two retention periods for the dataset A backup, or can be a default operation for data with a particular attribute (e.g., a second representation is created for all of an organization's data or only for certain departments). The backup appliance 110 creates the second representation based on the first representation of the dataset A backup. The backup application 110 creates the second representation to include a dataset A cloud backup metadata 123 and dataset A backup 125. The backup appliance 110 can create the second representation by copying the first representation. Although a copy, the result of the copy of the first representation will at least have a different identifier for the second representation. The backup appliance 110 can copy the dataset A 112 to create the dataset A backup 125 and suppress deduplication to maintain separation of the underlying data. However, the backup appliance 110 can also allow deduplication, which would result in the dataset A backup 125 being the same data of dataset A 112 as represented in the deduplicated data 130 and the non-deduplicated 129. In other words, the dataset A backup 125 may be references to data. These references may be part of the dataset A cloud backup metadata 123 or a separate structured referenced by the dataset A cloud backup metadata 123.

Stage D comprises the backup appliance 110 migrating the metadata 123 and dataset A backup 125 to the cloud storage 140. Migration of the metadata 123 and the dataset A backup 125 results in an object 141 (comprising metadata 142 and dataset backup 143), assuming the cloud storage 140 uses object based storage technology. The migrated form of the metadata 123 and the dataset A backup 125 can vary depending upon the service and/or protocol used (e.g., the Amazon Glacier® storage service, the Microsoft Azure platform, the StorageGRID® Webscale object storage software, an OpenStack® Swift object/blob storage interface, etc.). The retention period Nc governs the object 141 on the cloud storage 140. Upon expiration of Nc, the object 141 may be migrated again or to a different level of storage/archiving. After successful migration of the metadata 123 and dataset A backup 125, metadata 123 can be removed from the backup appliance 110 and the backup appliance 110 can notify the backup application 114 that the dataset A backup 112 has been stored in the cloud storage 140. This notification includes an identifier of the object A 141 to allow retrieval from the cloud storage 140. After the backup application 114 has been notified, the backup appliance 110 can begin to remove the dataset A backup from the backup appliance 110 to the extent that constituent data units are not shared by other backups on the backup appliance 110.

The data site 103 can include a variety of other hardware and/or software elements not depicted to avoid unnecessarily complicating FIG. 1. FIG. 1 depicts the data store 115 as a contrast to the backup server 116 and to avoid misinterpretations that the disclosure is limited to receiving a dataset for back up from a backup server. For instance, a client device may host a backup application that transmits a dataset for backup to the backup appliance 110.

In addition to allowing management of separate retention periods for a dataset backup, creating multiple representations of a dataset backup allows for greater control over other data lifecycle management variables (e.g., backup latency periods, specified backup policies for different user groups, etc.). Providing each of the multiple representations of a dataset backup with a unique identifier facilitates greater control by allowing the different variables to be associated with particular ones of the multiple representations. A service level agreement ("SLA") and/or storage lifecycle policy ("SLP") can be assigned to each dataset backup representation with the unique identifiers. The uniqueness of the representation identifiers can be ensured by using exclusive namespaces. For example, the identifiers can occupy exclusive namespaces by modifying a directory or subdirectory, storing representations into different logical containers (e.g., volumes), storing the representations in media with different mount points, etc.

Creating at least a cached representation and a cloud representation of a dataset backup allow for data isolation, for example for security compliance. The cached representation can be created with restricted permissions and/or stored to a restricted storage/memory. The cloud representation can be subject to or governed by a security policy that restricts movement of the cloud representation to a limited set of destinations (e.g., only to a specific cloud target) and only transmitted to the limited set of destinations via secure connections and/or protocols.

Figure 2:
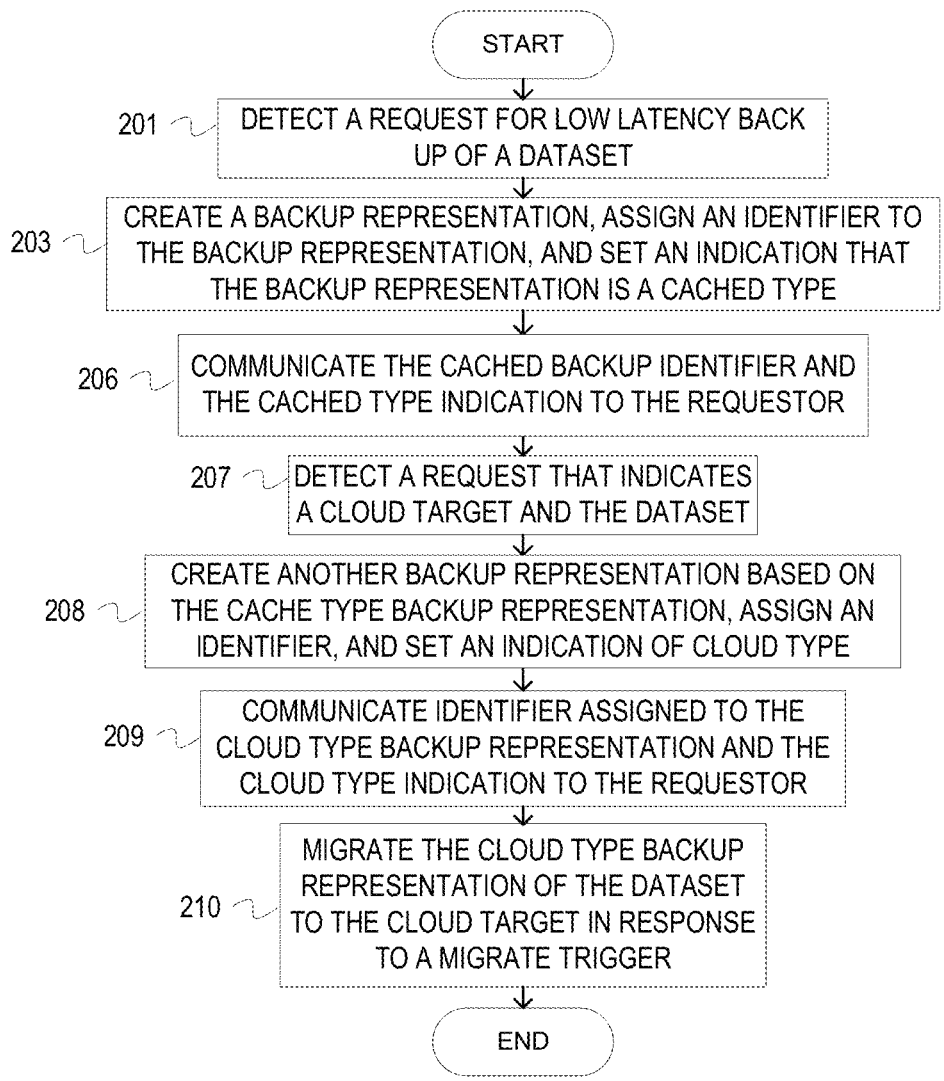
FIG. 2 depicts a flowchart of example operations for creating multiple representations of a dataset backup employing multiple retention periods and with explicit requests for the different representations from a backup application.

Creating multiple representations of a dataset backup also allows for the different representations to be associated with different SLAs/SLPs that conform to jurisdictional requirements. For example, a backup appliance can create two cloud representations for a dataset backup with each of the cloud representations to be stored into cloud storage in different jurisdictions. Since jurisdictions can have different data privacy laws, the separate cloud representations allows for jurisdiction specific SLAs/SLPs to be applied efficiently. For instance, a data owner can avoid creating a monolithic data management policy with rules for each jurisdiction and evaluation of the rules for each dataset backup migrated into cloud storage. In addition, an additional representation can be created with its own SLA/SLP and migrated to a different backup appliance as a standby for failover FIG. 2 depicts a flowchart of example operations for creating multiple representations of a dataset backup for multiple retentions periods with explicit requests for the different representations from a backup application. FIG. 2 refers to a storage tier manager as performing the example operations of FIG. 2. The term "storage tier manager") is used since the creation of multiple representations for multiple retention periods corresponds to back up of data into cloud storage. FIG. 2 refers to a storage tier manager instead of a backup appliance to avoid an interpretation that a specifically configured device (e.g., a storage appliance) is required. For example, a storage tier manager may be executing in a virtual machine. Dashed lines in FIG. 2 are used to show indirect or asynchronous flow between represented example operations.

At block 201, a storage tier manager detects a request for a low latency back up of a dataset. The request for a low latency back up of a dataset can be an explicit request to create a backup in low latency storage or can be implicit. A back up request can implicitly request a low latency back up as a side effect of requesting a back up of a dataset into cloud storage. The storage tier manager can be programmed to process a request for a cloud backup as a request for both a cloud back up and a low latency back up. As another example, the request can process any request to back up a dataset as a request to create two representations of the dataset, each for different retention periods.

At block 203, the cloud back up application creates a backup for the dataset. The storage tier manager creates a backup representation of the dataset. The cloud back up application assigns an identifier to the created backup representation, and sets an indication that the backup representation is of a cached type. The cached type of backup representation is set to indicate that the underlying data resides locally, not necessarily that it resides in conventional cache-type memory. Although the dataset is being backed up to storage that is local relative to cloud storage, the dataset is eventually being backed up into the cloud storage. The local storage will have lower access latency than the cloud storage. As illustrated in FIG. 1, the local storage can be storage devices (e.g., a disk storage array or a flash storage array) managed by a device (e.g., a storage appliance) at a data site "local" to the source data. "Local" can refer to the source data being on a same local area network, in a same building, etc. Regardless of specific deployment, the cached type backup representation can be accessed at a lower latency than cloud storage. The backup representation comprises metadata for both the representation and the dataset. The backup representation metadata includes the identifier that has been assigned to the backup representation by the storage tier manager (e.g., a universally unique identifier (UUID)). The backup representation can be considered to include the dataset backup or can include references to the dataset backup. The cloud backup appliance also sets an indication, for instance in the backup representation metadata, that the backup representation is of a cached type. This can later be used for operations that operate on representations by type. The backup representation can be considered logically to include the dataset backup, although the backup representation may have references to the constituent units of the dataset backup. More generally, the type indication can be a value that represents the corresponding storage tier. For example, a type indication for a first storage tier that is a low access latency storage can be a value "1" correspond to the first storage tier or can be "cached" to indicate it corresponds to a low access latency storage tier.

At block 206, the storage tier manager communicates the cached backup representation identifier and the cached type indication to the requestor. The storage tier manager communicates the identifier and the type indication in accordance with a communication protocol or storage network protocol used by the backup application to communicate with the storage tier manager. The storage tier manager provides the identifier and the type indication to the backup application to allow the backup application management control of the backup representation or to perform the previously described manipulations of the multiple representations of a dataset backup. For example, the requestor can notify the storage tier manager when the retention period for the cached backup representation expires.

At block 207, the storage tier manager detects a request that indicates a cloud target and the dataset. The backup application can send another request that indicates the dataset previously indicated in the other request. In some implementations, the backup application communicates a single back up request to the storage tier manager. The cloud back up application can process the single request as a request to create multiple representations.

At block 208, the storage tier manager creates another backup representation for the dataset. The storage tier manager assigns a different identifier to this additional backup representation and sets an indication that the representation is a cloud type of representation. The storage tier manager sets the cloud type indication to indicate that the backup representation and represented dataset backup are to be stored into cloud storage. The cloud type backup representation has a longer retention period, typically substantially longer (e.g., days versus years) than the cached type backup representation.

At block 209, the storage tier manager communicates the cloud backup representation identifier and the cloud type indication to the requestor. The requestor can use the cloud backup representation identifier to access the dataset backup in cloud storage. The storage tier manager can use the type to distinguish between dataset backups and metadata when evicting data or performing garbage collection.

At block 210, the storage tier manager migrates the cloud type backup representation of the dataset to the cloud target in response to a migrate trigger. The migrate trigger may be expiration of the retention period for the cached backup representation. If the cloud type backup representation does not include the underlying dataset backup, then the underlying dataset backup is also migrated and the relationship between the two is maintained in cloud storage as part of the migration.

Figure 3:
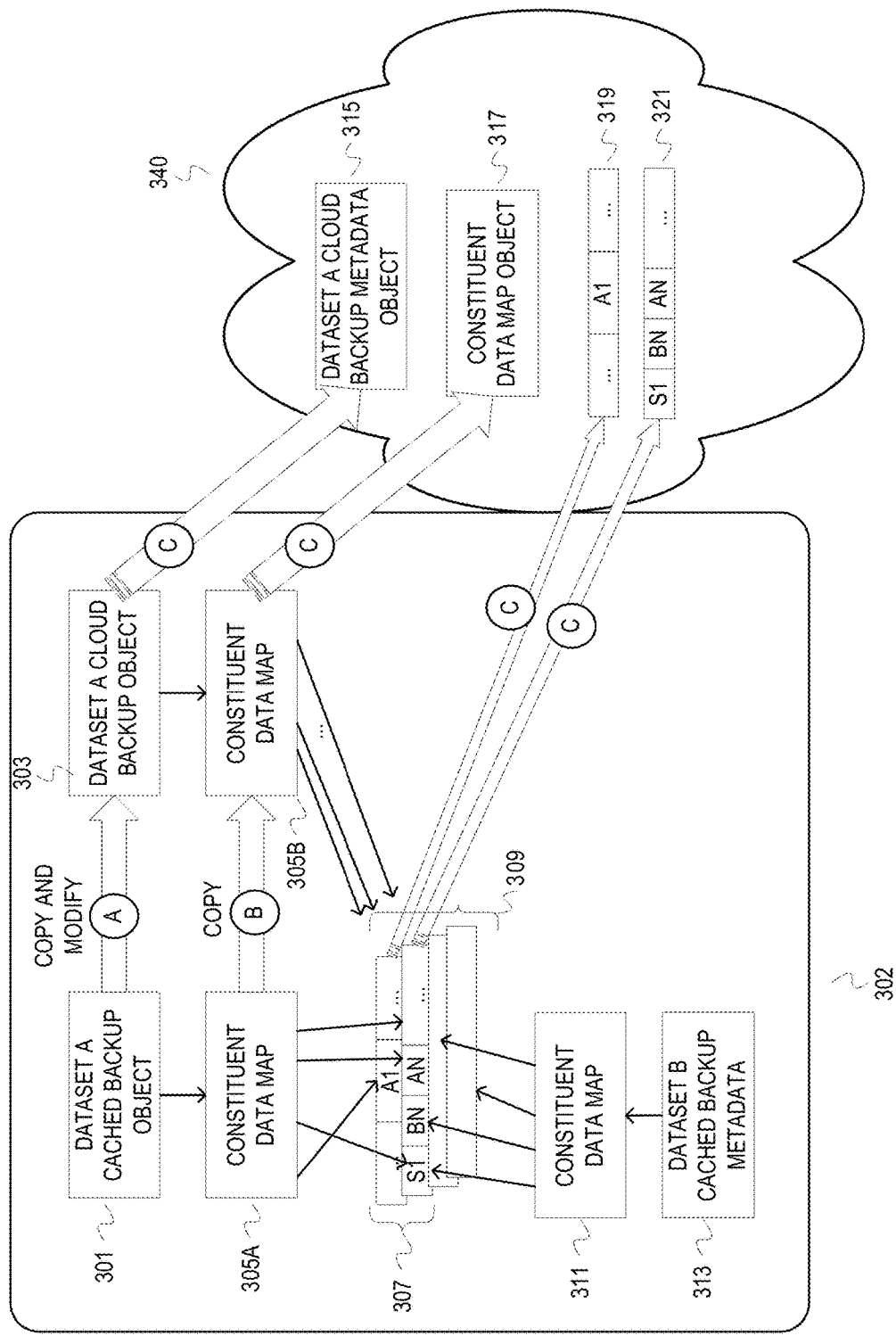
FIG. 3 depicts a conceptual diagram of an example storage tier manager that leverages the arrangement of references to deduplicated data for efficient creation of a cloud type backup representation.
Figure 4:
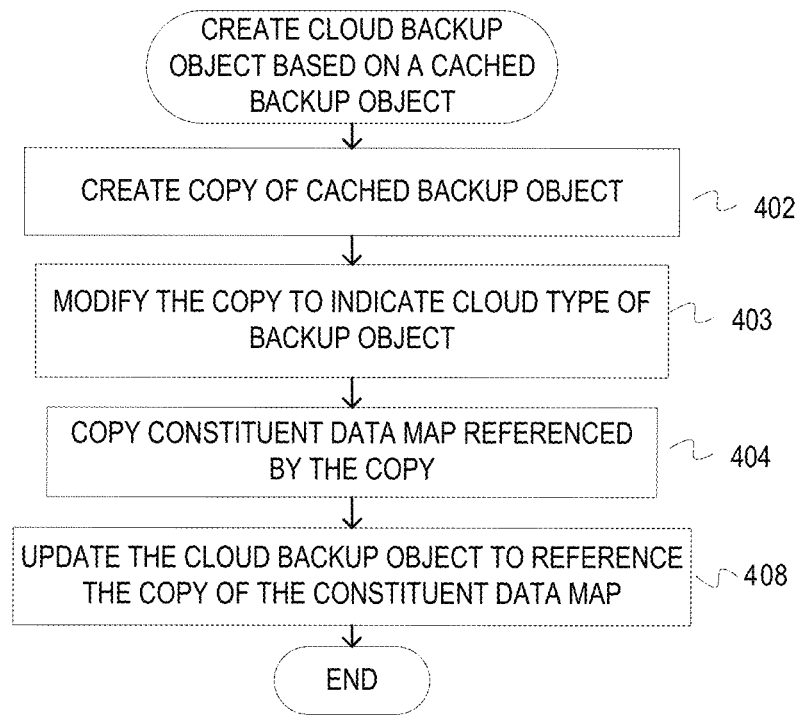
FIG. 4 depicts a flowchart of example operations for efficient creation of a cloud backup object based on a cached backup object for a dataset.

FIG. 2 presents example operations that encompass variations in creating and managing the multiple representations. FIGS. 3-4 provide example illustrations for multiple representations of a backup with multiple retention periods with deduplicated data. With deduplicated data, the metadata may be arranged in a manner that allows for faster creation of multiple representations of a backup. FIG. 3 depicts a conceptual diagram of an example storage tier manager that leverages the arrangement of references to deduplicated data for efficient creation of a cloud type backup representation. FIG. 4 depicts a flowchart of example operations for efficient creation of a cloud type backup representation.

In FIG. 3, a storage tier manager 302 backs up data to cloud storage 340 that uses object storage technology. The storage tier manager 302 is illustrated as managing backups for a dataset A and a dataset B. Due to deduplication, the dataset A backup and the dataset B backup share some data. The storage tier manager 302 aggregates units of data that constitute a dataset ("constituent data units"). The aggregation of constituent data units are referred to herein as a "data slab." The storage tier manager 302 may form a data slab from constituent data units of multiple datasets. Each constituent data unit of a data slab can be shared by multiple datasets. The storage tier manager 302 may form a data slab based on a configured size of a data slab. The storage tier manager 302 can build up a data slab with deduplicated, constituent data units until the configured data slab size is reached, with or without padding. The storage tier manager 302 maintains metadata for each data set to restore the dataset from the data slabs. This metadata for a dataset is referred to herein as a constituent data map. The constituent data map for a dataset includes identifiers of data slabs that have constituent data units of the dataset and location information per data slab. The location information indicates where each constituent data unit for a dataset begins within a data slab ("data slab offset") and length or size of the constituent data unit. The constituent data map may also indicate a compression algorithm and encryption used for the data slab.

With the dataset A backup and the dataset B backup, the storage tier manager 302 has formed data slabs 309 in FIG. 3. A dataset A cached backup object 301 refers to a constituent data map 305A. The constituent data map 305 A identifies data slabs 307, which are a subset of the data slabs 309. The dataset A cached backup object 301 includes metadata for the dataset A, an indication that the objects is of a cached type, and an object identifier. FIG. 3 refers to an object instead of a representation because the metadata for the dataset A is distinct from the metadata for the underlying constituent data units of the dataset A backup. This arrangement can be considered to break up a backup into 3 components: 1) the units of data that constitute a dataset, 2) metadata for locating the constituent data units or retrieval metadata, and 3) the dataset backup metadata. The data slabs 307 include constituent data units for the dataset A. For this limited example, a few of the constituent data units are identified as Ai, Si, and AN, with the constituent data unit Si representing a shared constituent data unit. The constituent data unit Si is also a constituent data unit for the dataset B. A constituent data map 311 for the dataset B backup references the constituent data unit Si in the data slab set 307 as well as element of the other data slabs in the data slabs 309. Dataset B cached backup metadata 313 refers to the constituent data map 311.

As in FIG. 1, FIG. 3 is annotated with a series of letters A-C. These letters represent stages of operations, each of which may comprise one or multiple operations. The stages are not necessarily exclusive and can overlap. Although these stages are ordered for this example, the stages illustrate one example to aid in understanding this disclosure and should not be used to limit the claims. Subject matter falling within the scope of the claims can vary with respect to the order and some of the operations.

Stage A comprises the storage tier manager 302 copying and modifying the dataset A cached backup object 301 to create a dataset A cloud backup object 303. The storage tier manager 302 at least modifies the copy to indicate the new identifier for the object 303 and to indicate the object type as cloud type. Stage A is triggered by an explicit or implicit request from a backup application to back up the dataset A, with the dataset A backup governed by multiple retention periods.

Stage B comprises the storage tier manager 302 copying the constituent data map 305A to create a constituent data map 305B. The storage tier manager 302 modifies the dataset A cloud backup object 303 to refer to the copied constituent data map 305B. At this point, the storage tier manager 302 has created two representations of the dataset A backup without the overhead of copying the underlying data. In addition, the storage tier manager 302 can rely on the deduplication program code to manage a subsequent modification of the underlying that causes the two representations of the dataset A backup to diverge. If a request to modify the cached backup for dataset A, then deduplication program code will manage the references so that the constituent data map 305A will be updated to refer to the changed data, likely in a different data slab, while the constituent data map 305B will continue referring to the unchanged data.

Stage C comprises the storage tier manager 302 migrating the cloud backup of the dataset A. To migrate the cloud back of the dataset A, the storage tier manager communicates, possibly after a transformation (e.g., compression, encryption, etc.), the dataset A cloud backup object 303, the constituent data map 305B, and the data slabs 307 to object storage 340. The migration results in four objects being stored in the object storage 340: 1) a dataset A cloud backup metadata object 315; 2) a constituent data map object 317; 3) an object 319 for the first of the data slabs 307; and 4) an object 321 for the second of the data slabs 307. The storage tier manager 302 creates these objects in the cloud storage 340 with object keys based on the identifiers of the corresponding structures managed by the storage tier manager 302. The storage tier manager 302 creates the object 321 with an object key based on the data slab identifier of the corresponding data slab. Similarly, the storage tier manager 302 creates the object 319 with an object key based on the slab identifiers of its corresponding data slab. The storage tier manager 302 creates the constituent data map object 317 with an object key based on the identifier of the constituent data map 305B. Finally, the storage tier manager 302 creates the dataset A cloud backup metadata object 315 with an object key based on the identifier of the dataset A cloud backup object 303.

While being somewhat driven by the data management/efficiency functionality of the storage tier manager 302, the separation of a backup into these multiple objects allow for efficient retrieval of different aspects of a dataset and efficiency in storage due. With the metadata object 315, metadata for the dataset A can be retrieved without retrieving the underlying dataset A, which would include retrieving the data slab objects 319, 321 and then reconstructing the dataset A from the retrieved data slab objects 319, 321. The overhead from reconstruction will vary depending upon the transformation of data before being migrated into cloud storage. For instance, the storage tier manager 302 may compress and encrypt a data slab before storing it to cloud storage. To reconstruct a dataset, a retrieved data slab will be decrypted and then decompressed before constituent data units of a data set can be extracted from the data slab. Storage efficiency from deduplication at the storage tier manager 302 carries into the cloud storage 340 since data slab objects will contain constituent data units shared across multiple dataset backups. After successful migration, the storage tier manager 302 may remove the dataset A cloud backup object 303 and the constituent data map 305B from the managed storage tier depending on the governing SLP. For instance, an SLP may allow a dataset backup to be present on multiple tiers with overlapping retention periods. After removal and/or after confirmation of the migration to cloud storage 340 depending upon the governing SLP, migration of the cloud backup for dataset A can be considered complete and the storage tier manager 302 can notify a requesting backup application that dataset A has been successfully stored into cloud storage 340. The storage tier manager 302 can also remove or evict constituent data units of dataset A that do not constitute other datasets.

At some point, the storage tier manager 302 can apply similar operations to the dataset B cached backup metadata 313 and the constituent data map 311. The storage tier manager 302 will copy and modify the metadata 313 to generate a dataset B cloud backup object. The storage tier manager 302 will also copy the constituent data map 311 that is referenced by the metadata 313. The storage tier manager 302 will update the dataset B cloud backup object to reference the copy of the constituent data map 311. The storage tier manager 302 will then migrate the dataset B cloud backup object and the copy of the constituent data map 311, with modification of references as described above for dataset A. The storage tier manager will also migrate those of the data slabs 309 referenced by the copy of the constituent data map 311 and that have not already been migrated to the cloud storage 340. For this example, the storage tier manager 302 has already created the data slab object 321 when migrating the dataset A backup. Therefore, the migration of the dataset B backup will reference the data slab object 321. The storage tier manager 302 can use different techniques to track migration of data slabs. The storage tier manager 302 can locally mark data slabs with an indication of successful migration into cloud storage and/or maintain a separate data structure that lists data slabs on the managed storage tier that have been migrated to another storage tier and identify the target storage tier. The storage tier manager 302 could also use a cloud service API defined function to determine whether the data slab has already been migrated to the cloud storage 340.

FIG. 4 depicts a flowchart of example operations for efficient creation of a cloud backup object based on a cached backup object for a dataset. FIG. 4 refers to the storage tier manager performing the operations for consistency with FIGS. 2-3. The operations of FIG. 4 provide an example illustration of one embodiment for creating another backup representation as indicated in block 208 of FIG. 2. At the point the operations of FIG. 4 commence, the storage tier manager has already determined that a dataset backup will have two representations.

At block 402, the storage tier manager creates copy of a cached backup object to create a cloud backup object. The copy operation will copy the backup object but assign a different identifier to the copy. This identifier can be generated and assigned to the copy by the operating system in which the storage tier manager executes.

At block 403, the storage tier manager modifies the copy with an indication that the object is a cloud type of backup object. The storage tier manager may also update the copy with a name/path provided by the backup application. For example, cached backup objects and cloud backup objects may be written to different paths and/or different sets of storage media corresponding to object type.

At block 404, the storage tier manager copies a constituent data map referenced by the copy which is the cloud backup object. When the storage tier manager copied the cached backup object, a reference to a constituent data map was also copied.

At block 408, the storage tier manager updates the cloud backup object to reference the copy of the constituent data map. The storage tier manager copies the constituent data map and updates the reference from the cloud backup object to the copy of the constituent data map to ensure the backup objects are distinct. Changes to the cached backup object will no longer impact the cloud backup object.

Figure 5:
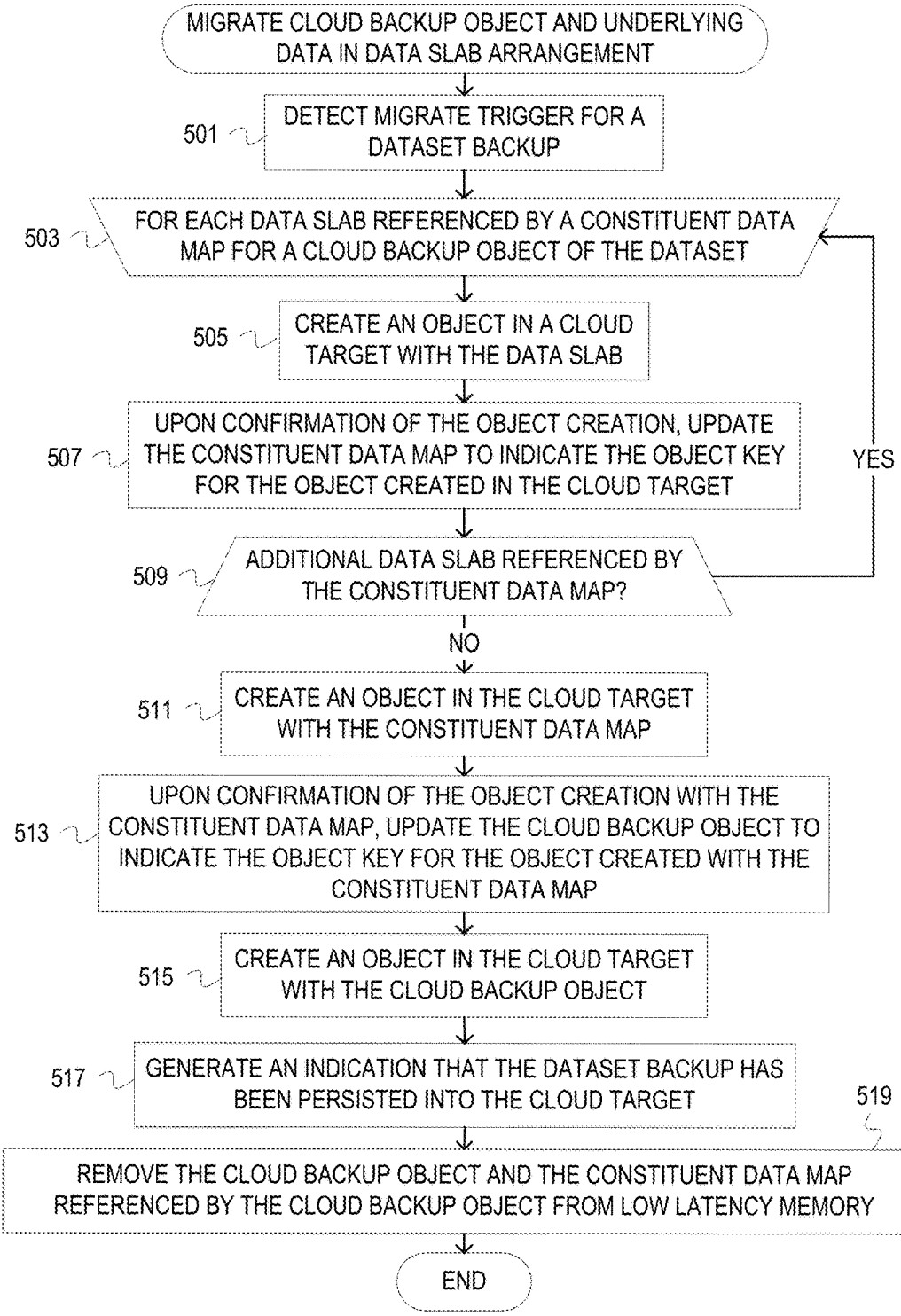
FIG. 5 is a flowchart of example operations for migrating a cloud backup object and underlying data in a data slab arrangement to object based cloud storage.

FIG. 5 is a flowchart of example operations for migrating a cloud backup object and underlying data in a data slab arrangement to object based cloud storage. FIG. 5 relates to the operations represented by Stage C of FIG. 3.

At block 501 the storage tier manager detects a migrate trigger. The migrate trigger may be sent from a backup application. The migrate trigger may be detection and/or notification of expiration of retention period Nr (which specifies a retention period for a cached backup object). Although a retention period can be defined for each type of backup object, embodiments can also set multiple retention periods for a dataset backup. The storage tier manager can then as a default operation interpret expiration of a retention period for a dataset backup as expiration for the cached backup object if the cloud backup object exists for the dataset backup. In addition, a backup application or other entity may notify the storage tier manager that Nr has expired, and may communicate an instruction to migrate a cloud backup object.

Block 503 commences a flow loop in the example operations of FIG. 5 such that, in conjunction with block 509 (below), blocks 505 and 507 are repeated at least once for substantially each data slab referenced by a constituent data map of the cloud backup object. By "substantially each data slab" it is meant that under certain conditions particular data slabs referenced by a constituent data map may not be included in the flow loop formed by Blocks 503 and 509. For instance, the storage tier manager can perform an additional operation to determine whether a data slab has already been migrated to a cloud target and then avoid operations migrating the same data slab again. The storage tier manager accesses the cloud backup object to determine the constituent data map(s) referenced by the cloud backup object. With the constituent data map for the cloud backup object, the storage tier manager can begin iterating over the references to constituent data units in the constituent data map.

During each iteration of the flow loop established by blocks 503 and 509, at block 505 the storage tier manager creates an object in a cloud target for the dereferenced data slab of the iteration. The storage tier manager creates the object with the dereferenced data slab. For instance, the storage tier manager may call a function defined by a cloud service provider's application programming interface to create the object. One of the arguments of the function can be the data slab, perhaps transformed from compression and encryption, and another argument of the function can be an object key to be used for identifying the object being created.

At block 507, the storage tier manager updates the constituent data map to indicate the object key for the created data slab object. The storage tier manager will eventually have updated the constituent data map referenced by the cloud backup object with object keys that identify the created data slab objects instead of references to the data slabs at a backup appliance.

At block 509, the storage tier manager determines whether there is another data slab referenced by the constituent data map. If so, then control returns to block 503 for processing of the next referenced data slab. Otherwise, control continues to block 511.

At block 511, the backup application creates an object in the cloud target with the constituent data map. After migration of the referenced data slabs into the cloud target, the constituent data map includes data slab object keys instead of references to data slabs in the low latency storage tier or local storage tier (i.e., local with respect to the storage tier manager). If the constituent data map object is retrieved from the cloud target, then the data slab object keys will be used to retrieve desired data slabs. The constituent data map object will still include information for restoring constituent data units of a dataset (e.g., location information, decryption information, decompression information, etc.).

At block 513, the storage tier manager updates the cloud backup object to indicate the object key for the constituent data map object upon confirmation that the constituent data map object has been created. Essentially, the storage tier manager replaces the local reference with the cloud reference (i.e., object key) to the constituent data map.

At block 515, the storage tier manager creates an object in the cloud target with the cloud backup object. For instance, the storage tier manager invokes the previously mentioned create object function with the cloud backup object as an argument. The storage tier manager can use the identifier of the cloud backup object as the object key or can derive the object key from the identifier or exposed name (e.g., file system handle) of the cloud backup object.

At block 517, the storage tier manager generates an indication that the dataset backup has been persisted into the cloud target. The storage tier manager can communicate to the backup application that the dataset backup has been stored in the cloud target and provide the object key for the cloud backup object.

At block 519, the storage tier manager removes the cloud backup object and the constituent data map referenced by the cloud backup object from the associated low latency storage tier. The constituent data units in data slabs referenced by the constituent data map may be removed by garbage collection if not referenced by other objects.

Figure 6:
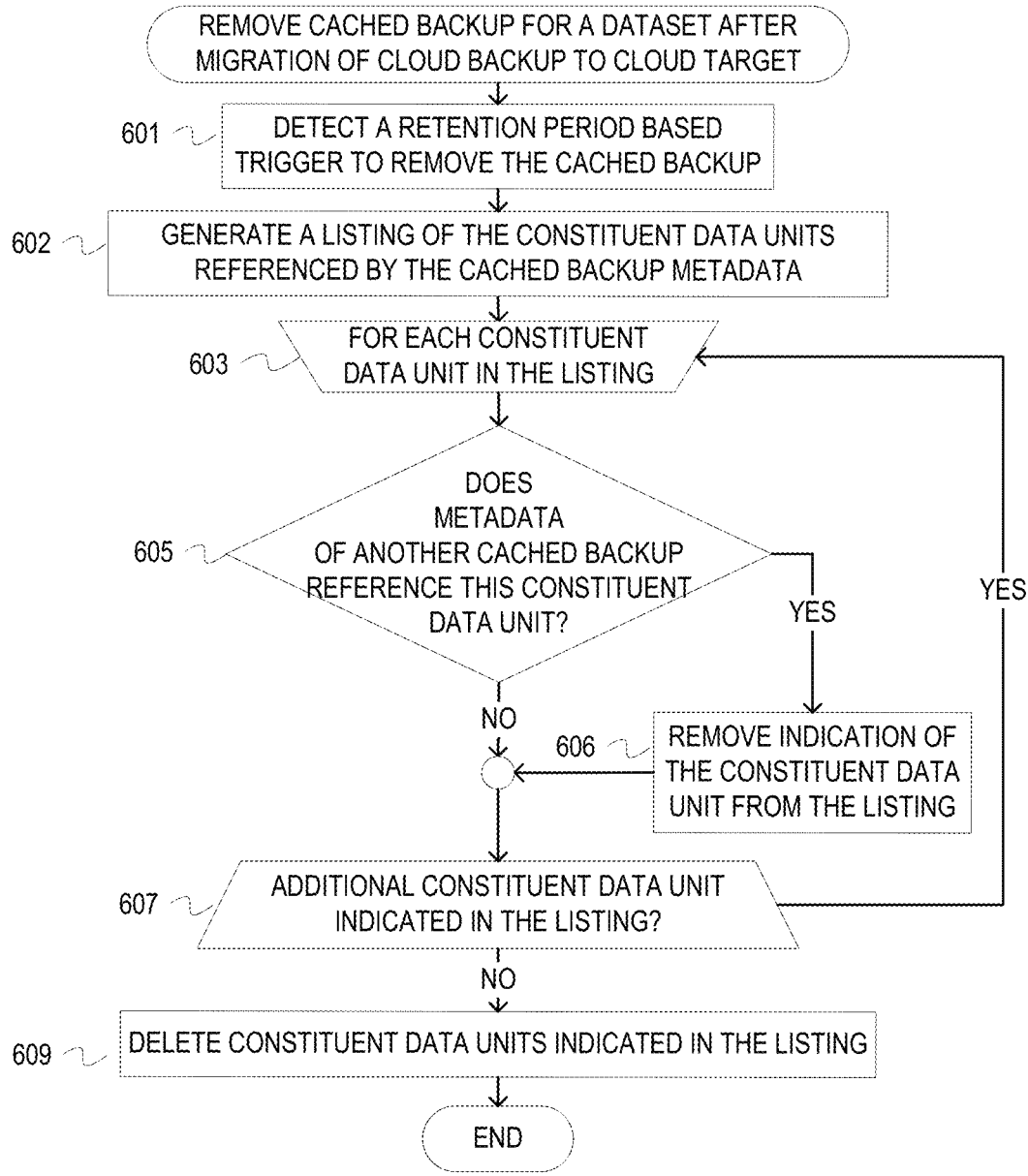
FIG. 6 is a flowchart of example operations for releasing a cached representation of a dataset backup after migration of a cloud representation of the dataset backup to a cloud target.
Figure 7:
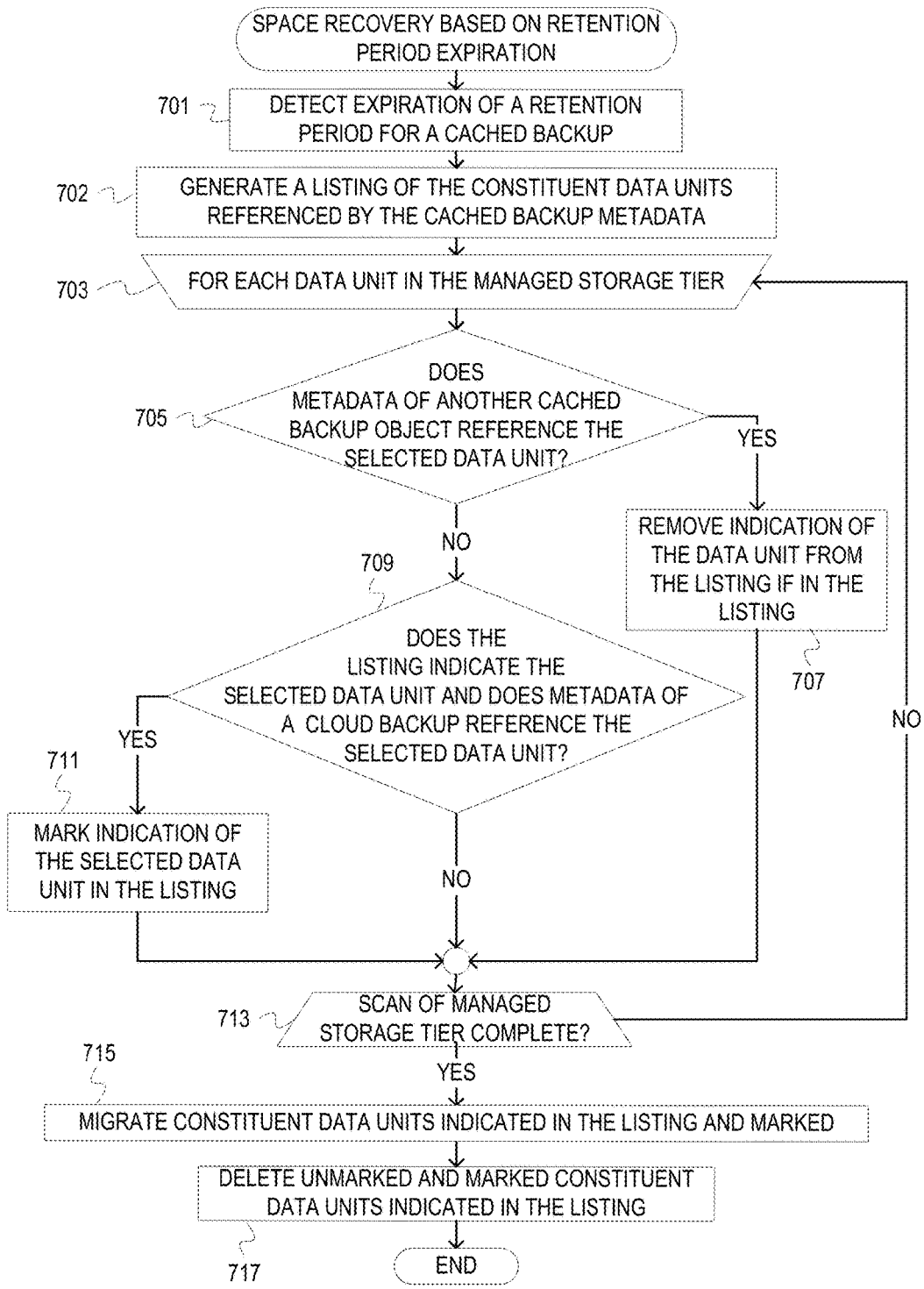
FIG. 7 is a flowchart of example operations for recovering storage space of a storage system that hosts a storage tier manager after expiration of a retention period for a cached representation of a dataset backup.

Removal of constituent data units of a migrated dataset backup can be performed differently. FIG. 6 depicts a flowchart of example operations that removes constituent data units as part of deleting the cached representation of the dataset backup from a local/low latency storage tier. FIG. 7 incorporates a garbage collection aspect for removal of constituent data units of an expired cached representation of a dataset backup.

FIG. 6 is a flowchart of example operations for releasing a cached representation of a dataset backup after migration of a cloud representation of the dataset backup to a cloud target. The storage tier manager removes the cached representation in response to a storage space recovery trigger. Examples of a storage space recovery trigger include completion of migration of the dataset backup to a different storage tier, a request to delete a dataset backup from a current tier, and/or expiration of a retention period associated with a current tier.

At block 601, the storage tier manager detects a retention period based trigger to remove a cached backup. A retention period based trigger corresponds to expiration of data retention period Np. However, the trigger is not necessarily the expiration of the retention period. The trigger may be successful migration of the corresponding cloud backup, which was triggered in response to expiration of the retention period.

At block 602, the storage tier manager generates a listing of the constituent data units referenced by the cached backup metadata. The storage tier manager can populate an array, hash table, linked list, etc., with the references (e.g., logical addresses) of the constituent data units and/or with identifiers of the constituent data units (e.g., block numbers).

At block 603, the storage tier manager begins processing each of the constituent data units indicated in the listing. The storage tier manager traverses the listing and selects each indicated constituent data unit for processing.

At block 605, the storage tier manager determines whether metadata of another cached backup references the selected constituent data unit. If a fingerprint database or an associated structure identifies objects that reference data represented by a fingerprint, then the storage tier manager can make the determination with the fingerprint database if the selected constituent data unit is shared. If the fingerprint database or an associated structure does not identify referring objects, then the storage tier manager can traverse all cached backups to determine whether any other cached backup refers to the selected constituent data unit. In some embodiments, the storage tier manager can access the fingerprint database to determine whether an entry exists for the selected constituent data unit. If an entry does not exist or if the reference counter is set to 1, then the storage tier manager can proceed as if no other cached backup references the selected constituent data unit. If the reference counter is greater than 1, then the storage tier manager proceeds to determine whether the additional reference is from a cached backup or a cloud backup. If another cached backup references the selected constituent data unit, then control flows to block 606. Otherwise, control continues to block 607.

At block 606, the storage tier manager removes indication of the selected constituent data unit from the listing. If another cached backup references the selected constituent data unit, it is not proper to release the selected constituent data block.

At block 607, the storage tier manager determines whether the listing includes another constituent data unit that has yet to be selected. If so, then control flows back to block 603. Otherwise, control flows to block 609.

At block 609 the storage tier manager deletes all constituent data units still indicated in the listing from the low latency storage tier. At this point, the listing should only indicate constituent data units only referenced by the cached backup with the expired retention period. A cloud backup should not reference a constituent data unit that is not referenced by its corresponding cached backup. Thus, a referencing cloud backup likely will be or is being removed.

FIG. 7 is a flowchart of example operations for recovering space of a storage tier managed by a storage tier manager after expiration of a retention period for a cached backup. Memory space recovery is accomplished through a comprehensive scan of substantially all data blocks on the low latency tier. FIG. 7 recovers memory space of data units that have already migrated but still reside on the managed tier.

At block 701, the storage tier manager detects the expiration of a retention period for a cached backup. Similar to 601, a retention period based trigger corresponds to expiration of data retention period Np. However, the trigger is not necessarily the expiration of the retention period. The trigger may be successful migration of the corresponding cloud backup, which was triggered in response to expiration of the retention period.

At block 702, the storage tier manager generates a listing of the constituent data units referenced by the cached backup metadata. Similar to 602, the storage tier manager can populate an array, hash table, linked list, etc., with the references (e.g., logical addresses) of the constituent data units and/or with identifiers of the constituent data units (e.g., block numbers).

At block 703, the storage tier manager begins to scan storage space of the storage tier managed by the storage tier manager for data units therein. Each data unit that the storage tier manager encounters during the scan is referred to as a selected data unit. The description for FIG. 7 uses data unit instead of constituent data unit for operations during the scan since a discovered data unit may not constitute any data set.

At block 705, the storage tier manager determines whether the metadata of another cached backup references the selected data unit. Similar to 605 of FIG. 6, how the storage tier manager makes this determination depends upon the information maintained for the dataset backups, for example the particular implementation of the fingerprint database. If a fingerprint database or an associated structure identifies objects that reference data represented by a fingerprint, then the storage tier manager can make the determination with the fingerprint database if the selected data unit is shared. If the fingerprint database or an associated structure does not identify referring objects, then the storage tier manager can traverse all cached backups to determine whether any other cached backup refers to the selected data unit. In some embodiments, the storage tier manager can access the fingerprint database to determine whether an entry exists for the selected constituent data unit. If an entry does not exist or an entry exists with a reference counter set to 1, then the storage tier manager can proceed as if no other cached backup references the selected data unit. If the reference counter is greater than 1, then the storage tier manager proceeds to determine whether the additional reference is from a cached backup or a cloud backup. If another cached backup references the selected constituent data unit, then control flows to block 707. Otherwise, control continues to block 709.

At block 707, the storage tier manager removes the indication of the selected data from the listing, if indicated in the listing. The selected data unit may be referenced by another cached backup and not the current cached backup, in which case the selected data unit would not occur on the listing. Control flows form block 707 to block 713.

If the storage tier manager determined that metadata of another cached backup does not reference the selected data unit at block 705, then, at block 709, the storage tier manager determines whether: 1) the listing of constituent data units includes the selected data unit, and 2) the metadata of a cloud backup also references the selected data unit. The storage tier manager makes this determination to identify those selected data units referenced by the metadata of the cached backup and metadata of a cloud backup still residing on the managed storage tier. If the listing indicates the selected data unit and metadata of a cloud backup references the selected data unit, then control flows to block 711. Otherwise, control flows to block 713.

At block 711, the storage tier manager marks the indication of the selected data unit in the listing. The storage tier manager marks the indication with a data flag (e.g., bit or multi-bit value). The data flag functions to identify constituent data blocks to be persisted into the cloud storage tier. Upon completion of block 711, flow may then proceed to block 713.

At block 713, the storage tier manager determines whether the scan of the storage tier managed by the storage tier manager is complete. If so, then control flows to block 715. Otherwise, control flows back to block 703.

At block 715 the storage tier manager migrates the constituent data units that remain indicated in the listing and that are marked with a data flag. The storage tier manager migrates the data units that have been marked in the listing to a cloud storage tier. This migration can be creation of objects in the cloud storage tier. As mentioned in the description for 709, the constituent data units that are migrated into the cloud storage tier are referenced by metadata of a cloud backup. The cloud backup is not necessarily the cloud backup corresponding to the cached backup. In other words, the scan of the storage tier ensures migration of constituent data units referenced by metadata of cloud backups that have not finished migrating into the cloud storage tier. Or the cloud backup could not yet migrate despite expiration of a corresponding cached backup because of the cloud backup metadata referenced a data slab, for example, that was not yet ready to be migrated into the cloud storage tier. A constituent data unit indicated in the listing that is not marked represents a constituent data unit referenced by metadata of a cached backup but for which the cloud backup has already migrated to the cloud storage tier.

At block 717, the storage tier manager deletes both unmarked and marked constituent data units indicated in the listing after migration to the cloud storage tier. That is to say, once migration of the marked constituent data units indicated in the listing has successfully completed, the storage tier manager may then proceed to delete or expire constituent data units indicated in the listing regardless of the marking. Those listed constituent data units that are not marked are constituent data units that have been previously migrated, perhaps shared data units migrated for another dataset backup. So, their removal can be considered garbage collection while also avoiding expenditure of resources to migrate them again, assuming idempotent migration.

Variations

The above example illustrations refer to managing a dataset backup according to two retention periods with multiple representations of the dataset backup. Embodiments, however, can create multiple representations of a dataset backup to facilitate a number of retention periods and storage tiers greater than two. For instance, each storage tier can host a storage tier manager. The storage tier manager at storage tier N which hosts a representation N for a dataset backup. The storage tier manager can be informed that the dataset backup is subject to a retention period $N_N$ and retention periods $N_{N+1,J1}$, and $N_{N+1,J2}$, both of which are greater than $N_N$. The notation J1 and J2 represent migration targets in different jurisdictions. Based on the multiple retention periods, the storage tier manager creates representation $N_{N+1,J1}$ and a representation $N_{N+1,J2}$. When $N_N$ expires, the storage tier manager migrates the representation $N_{N+1,J1}$ to a cloud target in the jurisdiction J1 and migrates the representation N $N_{N+1,J2}$ to a cloud target in jurisdiction J2.

In addition, the migrations are not necessarily to storage tiers with progressively lower performance capabilities (e.g., progressively lower reliability or higher access latency). In some cases, expiration of a retention period for a dataset backup representation may trigger migration to a higher performing storage tier. To illustrate, financial documents for a business may be migrated to a high access latency storage tier for 9 months and then migrated to a low access latency storage tier for a duration of tax season.

Furthermore, the terminology used herein is flexible to a degree. For instance, the example illustrations refer to representations of a dataset backup. The disclosure then allows for decomposition of a representation of a dataset backup into metadata for the dataset backup and the dataset. Example illustrations then separate the metadata into a backup object and a data map. Logically, different representations of a dataset backup can be considered different backups for the dataset. Although the different backups may have the same constituent data units (e.g., refer to the same data blocks, extents, or slabs), the identification of the metadata as different allows the backups to be separately manipulated and accessed. To illustrate, a backup appliance may create a backup file EX1_Cache and create a backup file EX2_Cloud in response to a request to backup a file EX1. Both files, EX1_Cache and EX2_Cloud have pointers that resolve to the same constituent data units. The backup files are distinct, but the files initially share the same constituent data units because they back up the same dataset.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
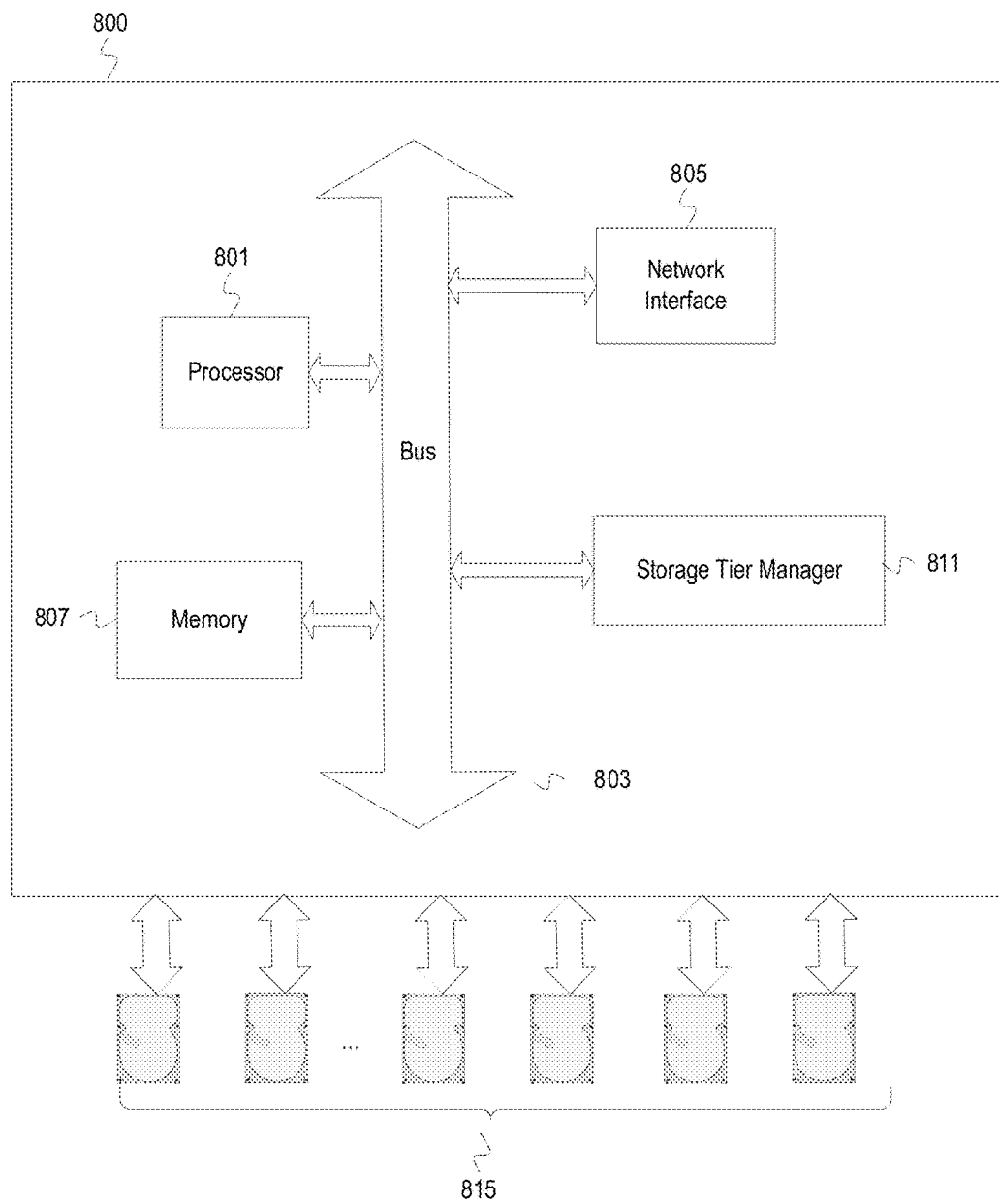
FIG. 8 depicts an example storage system with a storage tier manager that generates multiple representations of a dataset backup based on multiple retention periods.

FIG. 8 depicts an example storage system with a storage tier manager that generates multiple representations of a dataset backup based on multiple retention periods. The storage system includes a processor unit 801 (possibly including multiple processors, multiple cores, multiple nodes, and/or implementing multi-threading, etc.). The storage system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The storage system also includes a bus 803 (e.g., PCI, ISA, PCI-Express, HyperTransport® bus, InfiniBand® bus, NuBus, etc.) and a network interface 805 (e.g., a Fiber Channel interface, an Ethernet interface, an interne small computer system interface, SONET interface, wireless interface, etc.). The system also includes a storage tier manager 811 and a set of storage media 815. The storage tier manager 811 creates multiple representations for a dataset backup and allows lifecycle management of each of the representations based on a corresponding retention period and storage tier. When the storage system is a caching storage tier or low access latency storage tier, the storage tier manager 811 will create the multiple representations and can store each of the representations to exclusive ones of the storage media 815, or at least exclusive logical containers in the set of storage media 815. The storage media 815 may be a disk array, flash array, a hybrid array of flash and disk devices, etc. When removing constituent data units from a storage tier, the storage tier manager 811 preserves constituent data units that are shared, due to deduplication, by other representations of other dataset backups at the managed storage tier. The storage tier manager 811 can use information created by deduplication program code to determine which constituent data units are shared and not shared by backup representations of the managed storage tier. Any one of the previously described functionalities may be partially (or entirely) implemented in hardware and/or on the processor unit 801. For example, the functionality may be implemented with an application specific integrated circuit, in logic implemented in the processor unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801 and the network interface 805 are coupled to the bus 803. Although illustrated as being coupled to the bus 803, the memory 807 may be coupled to the processor unit 801.

While the aspects of the disclosure are described with reference to various implementations and exploitations, it will be understood that these aspects are illustrative and that the scope of the claims is not limited to them. In general, techniques for creating different representations of a dataset backup to allow management of the dataset backup across different storage tiers with different lifecycle management policies may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider. The terms "cloud storage" and "cloud storage tier" refer to a logical collection of "cloud targets." The term "cloud target" refers to an entity that has a network address that can be used as an endpoint for a network connection. The entity may be a physical device (e.g., a server) or may be a virtual entity (e.g., virtual server or virtual storage device). In more general terms, a cloud service provider resource accessible to customers is a resource owned/managed by the cloud service provider entity that is accessible via network connections. Often, the access is in accordance with an application programming interface or software development kit provided by the cloud service provider.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
creating, by a computing device, first and second representations of a dataset backup at first and second storage tiers, respectively, wherein the second representation has a second retention period longer than a first retention period of the first representation and the first and second representations reference data units on the first storage tier that constitute the dataset;
replicating, by the computing device, the data units to the second storage tier; and
removing, by the computing device, the first representation and those of the data units that are not referenced by a representation on the first storage tier of any other dataset backup, after expiration of the first retention period, wherein one or more of the data units are referenced by another representation on the first storage tier as a result of deduplication.

2. The method of claim 1, wherein each of the first and second representations comprises metadata about the dataset and location information of the data units.

3. The method of claim 1, further comprising copying, by the computing device, the first representation to create the second representation, wherein the first and second representations are associated with a respective unique identifier and comprise different versions of the dataset backup.

4. The method of claim 3, further comprising migrating, by the computing device, the second representation from the first storage tier to the second storage tier to create the second representation at the second storage tier.

5. The method of claim 1, further comprising creating, by the computing device, the first representation with an indication of a first type of representation corresponding to the first storage tier and the second representation with an indication of a second type of representation corresponding to the second storage tier.

6. The method of claim 1, wherein the first storage tier storing the first representation of the dataset backup is a caching storage tier and the second storage tier storing the second representation of the dataset backup is a cloud storage tier.

7. A non-transitory machine-readable medium having stored thereon instructions for multiple retention period based multi-tier dataset backup comprising machine executable code that, when executed by at least one machine, causes the machine to:

create first and second representations of a dataset backup at first and second storage tiers, respectively, wherein the second representation has a second retention period longer than a first retention period of the first representation and the first and second representations reference data units on the first storage tier that constitute the dataset;

replicate the data units to the second storage tier; and remove the first representation and those of the data units that are not referenced by a representation on the first storage tier of any other dataset backup, after expiration of the first retention period, wherein one or more of the data units are referenced by another representation on the first storage tier as a result of deduplication.

8. The non-transitory machine readable medium of claim 7, wherein each of the first and second representations comprises metadata about the dataset and location information of the data units.

9. The non-transitory machine readable medium of claim 7, wherein the machine executable code when executed by the machine further causes the machine to copy the first representation to create the second representation, wherein the first and second representations are associated with a respective unique identifier and comprise different versions of the dataset backup.

10. The non-transitory machine readable medium of claim 9, wherein the machine executable code when executed by the machine further causes the machine to migrate the second representation from the first storage tier to the second storage tier to create the second representation at the second storage tier.

11. The non-transitory machine readable medium of claim 7, wherein the machine executable code when executed by the machine further causes the machine to create the first representation with an indication of a first type of representation corresponding to the first storage tier and the second representation with an indication of a second type of representation corresponding to the second storage tier.

12. The non-transitory machine readable medium of claim 7, wherein the first storage tier storing the first representation of the dataset backup is a caching storage tier and the second storage tier storing the second representation of the dataset backup is a cloud storage tier.

13. A computing device, comprising:

a memory containing a machine-readable medium comprising machine executable code executable having stored thereon instructions for multiple retention period based multi-tier dataset backup; and a processor coupled to the memory, the processor configured to execute the machine executable code to cause the processor to:

create first and second representations of a dataset backup at first and second storage tiers, respectively, wherein the second representation has a second retention period longer than a first retention period of the first representation and the first and second representations reference data units on the first storage tier that constitute the dataset;

replicate the data units to the second storage tier, and remove the first representation and those of the data units that are not referenced by a representation on the first storage tier of any other dataset backup, after expiration of the first retention period, wherein one or more of the data units are referenced by another representation on the first storage tier as a result of deduplication.

14. The computing device of claim 13, wherein each of the first and second representations comprises metadata about the dataset and location information of the data units.

15. The computing device of claim 13, wherein the processor is further configured to execute the machine executable code to copy the first representation to create the second representation, wherein the first and second representations are associated with a respective unique identifier and comprise different versions of the dataset backup.

16. The computing device of claim 15, wherein the processor is further configured to execute the machine executable code to migrate the second representation from the first storage tier to the second storage tier to create the second representation at the second storage tier.

17. The computing device of claim 13, wherein the processor is further configured to execute the machine executable code to create the first representation with an indication of a first type of representation corresponding to the first storage tier and the second representation with an indication of a second type of representation corresponding to the second storage tier.

18. The computing device of claim 13, wherein the first storage tier storing the first representation of the dataset backup is a caching storage tier and the second storage tier storing the second representation of the dataset backup is a cloud storage tier.

* * * * *